No. 630,709. Patented Aug. 8, 1899.
R. W. JAMIESON.
GEARING.
(Application filed Jan. 5, 1898.)
(No Model.)
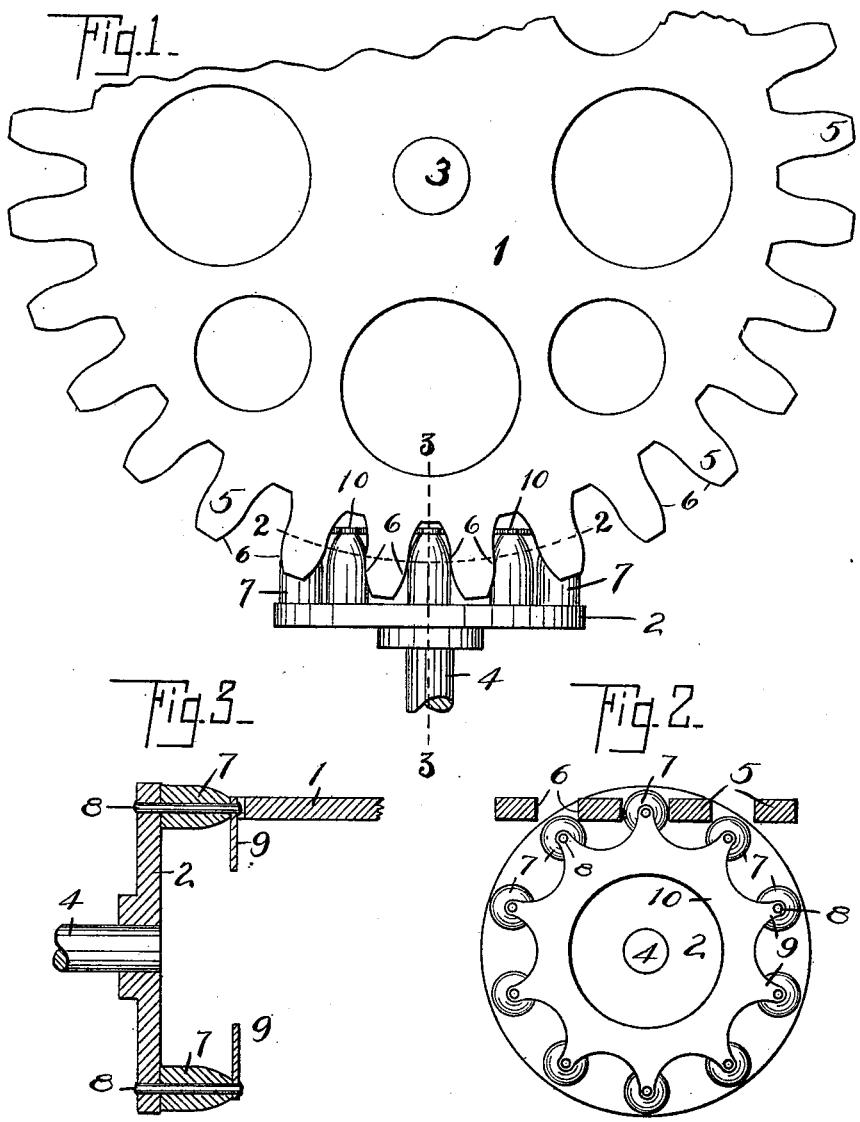

UNITED STATES PATENT OFFICE.

ROBERT W. JAMIESON, OF ROCHESTER, NEW YORK, ASSIGNOR TO THE JAMIESON MANUFACTURING COMPANY, OF SAME PLACE.

GEARING.

SPECIFICATION forming part of Letters Patent No. 630,709, dated August 8, 1899.

Application filed January 5, 1898. Serial No. 665,673. (No model.)

*To all whom it may concern:*

Be it known that I, ROBERT W. JAMIESON, of Rochester, in the county of Monroe and State of New York, have invented certain new and useful Improvements in Gearing; and I do hereby declare the following to be a full, clear, and exact description of the same, reference being had to the accompanying drawings, forming a part of this specification, and to the reference-numerals marked thereon.

My present invention has for its object to provide improved gearing for shafts or wheels arranged at an angle to each other which will enable the parts to operate easily and smoothly in both directions with minimum friction and will permit either of the wheels to operate as the driver without lost motion, said gearing being thereby particularly adapted for use as the driving mechanism for cycles; and to these ends it consists in certain improvements hereinafter described, the novel features being pointed out in the claims at the end of this specification.

In the drawings, Figure 1 is a plan view of a gearing embodying my improvements; Fig. 2, a view of the same, taken at right angles to the plane of Fig. 1 with the teeth in section on the line 2 2; Fig. 3, a sectional view on the line 3 3 of Fig. 1.

Similar reference-numerals indicate similar parts.

The gearing containing my invention embodies two wheels or disks 1 and 2, adapted to rotate on axes arranged at an angle to each other, (preferably at a right angle,) said wheels in the present embodiment of the invention being secured to shafts 3 and 4, which may form the crank-shaft and longitudinally-extending shaft of a so-called "chainless" bicycle. The wheel 1 has cut or otherwise formed on its periphery gear-teeth 5, the engaging surfaces 6 of which are formed on epicycloidal or involute curves—that is to say, on curves described by teeth or surfaces on a wheel rotating synchronously with the wheel on which said teeth or surfaces are located. The wheel 2 is in the present embodiment in the form of a disk on shaft 4, and the engaging surfaces thereon are rollers 7, conoidal in shape—that is, tapering on a gradual curve at their outer end toward their axes, which latter consist of pins 8, fastened to the disk. The surfaces of the rollers are also on epicycloidal or involute curves, said rollers being solids of revolution, and they turn on the pins and in a plane at an angle, preferably approximately a right angle, to the plane of rotation of the wheel or disk; but this angle could be varied slightly without impairing the results to any considerable degree. It will also be noted that the rollers rotate on axes parallel with the axis of the disk or wheel on which they are mounted and that their axes are approximately parallel with the plane of rotation of the teeth on the opposite gear.

If desired, suitable antifriction-bearings, such as rows of balls, may be arranged between the pins and rollers, this construction being shown in one of my pending applications.

Instead of supporting the pins 8 at one end only I connect their outer ends rigidly to arms 9 on a plate 10, which latter may or may not be connected to the shaft 4 and in the present embodiment is shown as unconnected. This plate 10 serves to connect all the pins, so that any force applied to one pin through its roller will be transferred to and resisted by all of the other pins, and thus the breaking or bending of the pins by excessive or unusual strains will be prevented without materially increasing the weight of the parts.

The conoidal form of the rollers, in connection with the teeth having their surfaces on epicycloidal or involute curves, causes the motion of one wheel to be transmitted evenly and without undue friction to the other and to operate with a receding instead of an approaching action, said rollers and teeth rocking on each other as they approach the center line, and the rollers turning freely and rolling on the face of the teeth as they move toward and from the center line of the toothed wheel 1.

The gearing described is simple and comparatively cheap in construction and is well adapted for use on bicycles, as the receding action is the same when operated with either wheel as the driver and the velocity ratio constant or uniform.

I claim as my invention—

1. In angle-gearing, the combination of two wheels with their axes arranged at an angle, the engaging surfaces on one wheel consisting of a series of rollers rotatable on axes approximately parallel with the axis of the wheel, and the teeth on the other wheel and with which the rollers engage extending in the plane of rotation and having both their engaging faces formed on curves substantially as described, whereby either of the wheels may serve as the driver.

2. Gearing, embodying two wheels with their axes arranged at an angle, the engaging surfaces on one wheel consisting of a series of conoidal rollers rotatable on axes approximately parallel with the axis of the wheel and the teeth on the other wheel and with which the rollers engage extending in the plane of rotation and having both their engaging surfaces formed on curves substantially as described, whereby either of the wheels may serve as the driver.

3. In an angle-gearing, two gear-wheels with their axes arranged at an angle, the engaging surfaces of one wheel consisting of a series of rollers rotatable on their axes, and the teeth on the other wheel with which the rollers engage extending in the plane of rotation and having both their engaging faces formed on curves substantially as described, whereby either of the wheels may serve as the driver.

4. In an angle-gearing, two gear-wheels with their axes arranged at an angle, the engaging surface of one wheel consisting of a series of rollers rotatable on their axes, and having their engaging surfaces curved, substantially as described, and the teeth of the other wheel extending in the plane of its rotation and engaging with the roller-teeth to produce a uniform rolling motion.

5. In an angle-gearing, two gear-wheels with their axes arranged at an angle, the engaging surfaces of one wheel consisting of a series of rotary roller-teeth, which are solids of revolution, and the engaging surfaces of the other wheel consisting of stationary teeth extending in the plane of its rotation, producing a uniform motion.

6. The combination with the disk or wheel, having the pins thereon extending in planes approximately parallel with the plane of the axis, and the rollers turning on the pins, of the ring connected to and entirely supported upon the outer ends of the pins.

7. The combination with the disk or wheel, having the pins thereon, and the rollers turning freely on said pins, of the ring having the radial fingers thereon connected to and entirely supported upon the outer ends of the pins.

8. In an angle-gearing, the combination of two wheels with their axes arranged at an angle, the engaging surfaces of one wheel consisting of teeth extending in the plane of rotation and formed on curves substantially as described and the engaging surfaces on the other wheel consisting of rollers rotating on axes parallel with the axis of rotation of said wheel.

9. In an angle-gearing, the combination of two wheels with their axes arranged at an angle, the engaging surfaces on one wheel consisting of teeth extending in the plane of rotation and having both their engaging faces formed on curves substantially as described, and the engaging surfaces on the other wheel consisting of rollers rotating on axes parallel with the plane of rotation of the teeth on the other wheel.

10. In an angle-gearing, the combination of two wheels with their axes arranged at an angle, the engaging surfaces on one wheel consisting of rollers rotatable on bearings parallel with the axis of rotation of the supporting-wheel, and the engaging surfaces of the co-operating wheel consisting of solid teeth projecting in their plane of rotation and having both the working surfaces formed on the curves described by the movement of the surfaces of the rollers on the other wheel, when said two wheels are rotated on their axes with their engaging surfaces operating at the same speed.

ROBERT W. JAMIESON.

Witnesses:
F. F. CHURCH,
G. WILLARD RICH.